United States Patent
Yu et al.

(10) Patent No.: US 11,840,008 B2
(45) Date of Patent: Dec. 12, 2023

(54) LIGHT-TRANSMITTING DECORATED MOLDING ARTICLE AND METHOD OF FABRICATING THE SAME

(71) Applicant: Jin Ya Dian Technology Co., Ltd., Taoyuan (TW)

(72) Inventors: Che-Ming Yu, New Taipei (TW); Kuo-Liang Ying, Taoyuan (TW)

(73) Assignee: Jin Ya Dian Technology Co., Ltd., Taoyuan (TW)

( * ) Notice: Subject to any disclaimer, the term of this patent is extended or adjusted under 35 U.S.C. 154(b) by 0 days.

(21) Appl. No.: 17/509,059

(22) Filed: Oct. 24, 2021

(65) Prior Publication Data

US 2022/0371256 A1 Nov. 24, 2022

(30) Foreign Application Priority Data

May 21, 2021 (TW) ................. 11011836.8
Sep. 16, 2021 (TW) ................. 11013457.7

(51) Int. Cl.
*B29C 51/02* (2006.01)
*B23K 26/364* (2014.01)
*B23K 26/40* (2014.01)
*B29C 51/14* (2006.01)
*B23K 103/00* (2006.01)
(Continued)

(52) U.S. Cl.
CPC ............ *B29C 51/02* (2013.01); *B23K 26/364* (2015.10); *B23K 26/40* (2013.01); *B29C 51/14* (2013.01); *B23K 2103/166* (2018.08); *B23K 2103/42* (2018.08); *B29C 2045/14704* (2013.01); *B44C 5/0453* (2013.01)

(58) Field of Classification Search
CPC .......... B29C 51/14; B29C 2045/14704; B44C 5/0453

See application file for complete search history.

(56) References Cited

U.S. PATENT DOCUMENTS

2010/0156007 A1* 6/2010 Huang ............... B41M 5/24
                                                    264/478
2016/0031135 A1* 2/2016 Hicks ................ B32B 38/145
                                                    264/279

(Continued)

FOREIGN PATENT DOCUMENTS

| CN | 212025235 | 11/2020 |
|---|---|---|
| DE | 102016200342 | 7/2017 |
| WO | 2019233929 | 12/2019 |

OTHER PUBLICATIONS

"Search Report of Europe Counterpart Application", dated May 11, 2022, p. 1-p. 10.

*Primary Examiner* — Kelly M Gambetta
*Assistant Examiner* — Virak Nguon
(74) *Attorney, Agent, or Firm* — JCIPRNET

(57) ABSTRACT

A method of fabricating a decorated molding article includes forming an all-in-one coating on a substrate and performing a curing step, thereby forming a composite layer structure with a protective effect, a color effect, and a bonding effect. The composite layer structure may form a molded film with better physical properties (e.g., higher hardness, better protection effect, and the like) after the blister molding process. Therefore, the molded film of the embodiments may be applied to a laser engraving process to form a variety of light-transmitting decorated molding articles.

5 Claims, 15 Drawing Sheets

(51) Int. Cl.
  *B23K 103/16* (2006.01)
  *B29C 45/14* (2006.01)
  *B44C 5/04* (2006.01)

(56) References Cited

U.S. PATENT DOCUMENTS

2016/0200082 A1* 7/2016 Awa ........................ C08J 7/0423
                                                    428/336
2021/0245418 A1* 8/2021 Li .......................... B29C 51/002

* cited by examiner the light source is off the light source is on the light source is off the light source is on

LIGHT-TRANSMITTING DECORATED MOLDING ARTICLE AND METHOD OF FABRICATING THE SAME

CROSS-REFERENCE TO RELATED APPLICATION

This application claims the priority benefit of Taiwan application Ser. No. 110118368, filed on May 21, 2021 and Taiwan application Ser. No. 110134577, filed on Sep. 16, 2021. The entirety of each of the above-mentioned patent applications is hereby incorporated by reference herein and made a part of this specification.

BACKGROUND

Technology Field

The disclosure relates to a light-transmitting decorated molding article and a method of fabricating the same.

Description of Related Art

Generally speaking, decorations such as patterns or texts formed on the surface of an object shell are mainly formed through a spraying or printing process in order to present a specific visual effect and increase the variety of the appearance of the object. A conventional forming method is to spray a hardened layer on the surface of the shell after the shell of the related product is completed. This method has a cumbersome process, poor yield, and may cause organic solvent gas pollution, leading to many pollution problems. On the other hand, the spraying process has the disadvantages of time-consuming, complicated process, and low thickness uniformity, so it is not suitable for mass production.

To solve the problems, various specific decoration processes using decorative films have been proposed. For example, in-mold decoration (IMD) or out mold decoration (OMD) has become an alternative for forming surface graphics.

Currently, the commonly used polymer substrate materials in in-mold decoration include polycarbonate (PC), polymethyl methacrylate, also known as poly(methyl methacrylate) (PMMA), polyethylene terephthalate (PET), and acrylonitrile-butadiene-styrene (ABS). However, a substrate including PC and ABS has a low level of hardness, which subjects the surface of the substrate to damage. Therefore, generally the substrate is coated with a protective layer to increase the hardness and scratch resistance of the substrate surface. On the other hand, a substrate including PMMA has a high level of hardness, but it is easy to crack during forming, leading to difficulty in performing a hot press process.

Specifically, in-mold decoration (IMD) may include in mold labeling (IML), in mold film (IMF or INS), and in mold roller (IMR) as shown in Table 1. In mold labeling (IML) is characterized by a hardened transparent film on the surface, a printed pattern layer in the middle, and a plastic layer on the back. The ink is sandwiched between the hardened transparent film and the plastic layer, so the surface of the product may be prevented from being scratched, it is abrasion-resistant, and the color brightness may last and does not fade easily for a long time. The in mold roller (IMR) is to print a pattern on the film, and through a film feeder, the film is attached to the mold cavity and then injected. After the injection, the patterned ink layer is separated from the film, the ink layer is left on the plastic part, and a plastic part with a decorative pattern on the surface is obtained. Therefore, the surface of the final product processed by in mold roller does not have a transparent protective film, and the film is only a carrier in the production process. That is, the biggest difference between in mold labeling (IML) and in mold roller (IMR) is whether there is a transparent protective film on the surface of the product. Moreover, in mold film (IMF) is similar to in mold labeling (IML).

TABLE 1

| model | Introduction |
| --- | --- |
| IMR | In mold roller: the film peels off and does not remain on the surface after ink transfer. The surface of the final product does not have a transparent protective film, and the film is only a carrier in the production process. The degree of automation in production is high and the cost of mass production is low. The disadvantage is that the printed pattern layer is thin on the surface of the product. After the product is used for a period of time, the printed pattern layer is easily worn off, and the color is also easy to fade, resulting in an unsightly surface. |
| IML | In mold labeling: the film may remain in the appearance to form a protective layer. The surface is a hardened transparent film, the middle is a printed pattern layer, and the back is a plastic layer. The ink is sandwiched in the middle, so the surface of the product may be prevented from scratches and abrasion, and the color brightness may last and does not fade easily for a long time. |
| IMF | Film plane printing may be 3D or 2D molding. Features and fabricating process are similar to IML. |

Out mold decoration (OMD) is also known as high-pressure transfer printing. After printing the pattern on the transparent film, high/medium/low pressure and vacuum transfer are used to directly transfer the pattern to the plastic shell. The main feature is tactile products and used in 3C, home appliances, and automobiles.

However, regardless of IMD or OMD film, printing and stacking are used for processing light-transmitting decorated molding articles. The blister, cutting, and injection molding processes performed by a client may lead to disadvantages such as difficult alignment, excessive material loss and increased costs, and the difficulty of the subsequent laser engraving process also makes it impossible to process products such as light-transmitting patterns.

Table 2 illustrates the characteristics and advantages of various conventional decoration techniques.

TABLE 2

| | | | |
| --- | --- | --- | --- |
| Process characteristics | Injection is required to be performed before surface post-processing, and it is difficult to do multi-color processing process. | A variety of multi-color printings on the substrate film are required, and after a variety of combinations are performed, the injection molding is then performed. | A variety of multi-color printings on the substrate film are required, and after a variety of combinations are performed, the part is completed by high-pressure forming and bonding. |
| Laser engraving and translucent processing | 1. The process is cumbersome and difficult to process<br>2. Higher cost | 1. Thin-film laser engraving is not easy and easily leads to poor results.<br>2. It is not easy to maintain the physical properties of the product surface after laser engraving, and |

TABLE 2-continued

| | |
|---|---|
| 3. High degree of environmental pollution | an addition of the post-spraying process is required.<br>3. The client accordingly needs to perform the positioning and molding process, which results in difficult alignment, high cost, and poor yield performance. |

SUMMARY

The disclosure provides a method of fabricating a decorated molding article, which includes steps as follows. A coating is provided. The coating at least includes a protective material, an ink material, and a bonding material uniformly mixed together. The coating is formed on a substrate by using a coating method or a printing method. A first curing step is performed to form a composite layer structure. The composite layer structure at least includes an optical hardening layer disposed on the substrate. A blister molding process is performed to form a molded film. A second curing step is performed to increase a hardness of the molded film, and a laser engraving process is performed.

In an embodiment of the disclosure, the protective material includes polymethyl methacrylate (PMMA), aliphatic urethane diacrylate, epoxy acrylate (EA), polyester polyol, or a combination thereof; the ink material includes polyurethane (PU); and the bonding material includes thermoplastic polyurethane (TPU), aromatic urethane diacrylate, or a combination thereof.

In an embodiment of the disclosure, the coating further includes a heat-resistant material, a solvent, and a hardener.

In an embodiment of the disclosure, after the blister molding process is performed, the method further includes performing in-mold decoration or out mold decoration technique to the molded film, so that the molded film is attached to an outer surface of a workpiece to form the decorated molding article.

In an embodiment of the disclosure, after the laser engraving process is performed, the method further includes performing in-mold decoration or out mold decoration technique to the molded film, so that the molded film is attached to an inner surface of a workpiece to form the decorated molding article.

The disclosure provides a method of fabricating a decorated molding article. The method includes steps as follows. A substrate with a first surface and a second surface opposite to each other is provided. A second coating is formed on the second surface of the substrate by using a coating method or a printing method. The first coating is formed on the second coating by using a coating method or a printing method. A first curing step is performed to form a composite layer structure. The composite layer structure at least includes the substrate, a first decoration layer disposed on the second surface of the substrate, and a second decoration layer disposed between the second surface of the substrate and the first decoration layer. A blister molding process is performed to form a molded film, and a laser engraving process is performed.

In an embodiment of the disclosure, the first coating and the second coating each include a protective material, an ink material, and a bonding material uniformly mixed together.

In an embodiment of the disclosure, the protective material includes polymethyl methacrylate (PMMA), aliphatic urethane diacrylate, epoxy acrylate (EA), polyester polyol, or a combination thereof; the ink material includes polyurethane (PU); and the bonding material includes thermoplastic polyurethane (TPU), aromatic urethane diacrylate, or a combination thereof.

In an embodiment of the disclosure, after the laser engraving process is performed, the method further includes performing in-mold decoration or out mold decoration technique to the molded film, so that the molded film is attached to an inner surface of a workpiece to form the decorated molding article.

The disclosure provides a decorated molding article, which includes a workpiece and a molded film attached to an outer surface of the workpiece. The molded film includes a substrate with a first surface and a second surface opposite to each other; a first decoration layer disposed on the first surface of the substrate; a second decoration layer disposed on the first decoration layer; an optical hardening layer disposed on the second decoration layer; and a groove extending downward from a top surface of the optical hardening layer into the second decoration layer. The decoration layers may achieve different effects by stacking different numbers of layers. The first decoration layer, the second decoration layer, and the optical hardening layer each include a protective material, an ink material, and a bonding material.

In summary, in the disclosure, the all-in-one coating is formed on the substrate and the curing step is performed to form a composite layer structure with protective effects, color effects, and bonding effects. This composite layer structure may form a molded film with better physical properties (e.g., higher hardness, better protection effect, and the like) after the blister molding process. Therefore, the molded film of the embodiments may be applied to a laser engraving process to form a variety of light-transmitting decorated molding articles. Moreover, in the disclosure, the laser engraving process is performed after the blister molding process. Therefore, the disclosure may solve the alignment problem of the conventional technology, thereby improving the yield rate and reducing the fabricating cost.

DESCRIPTION OF THE EMBODIMENTS

Figure 1:
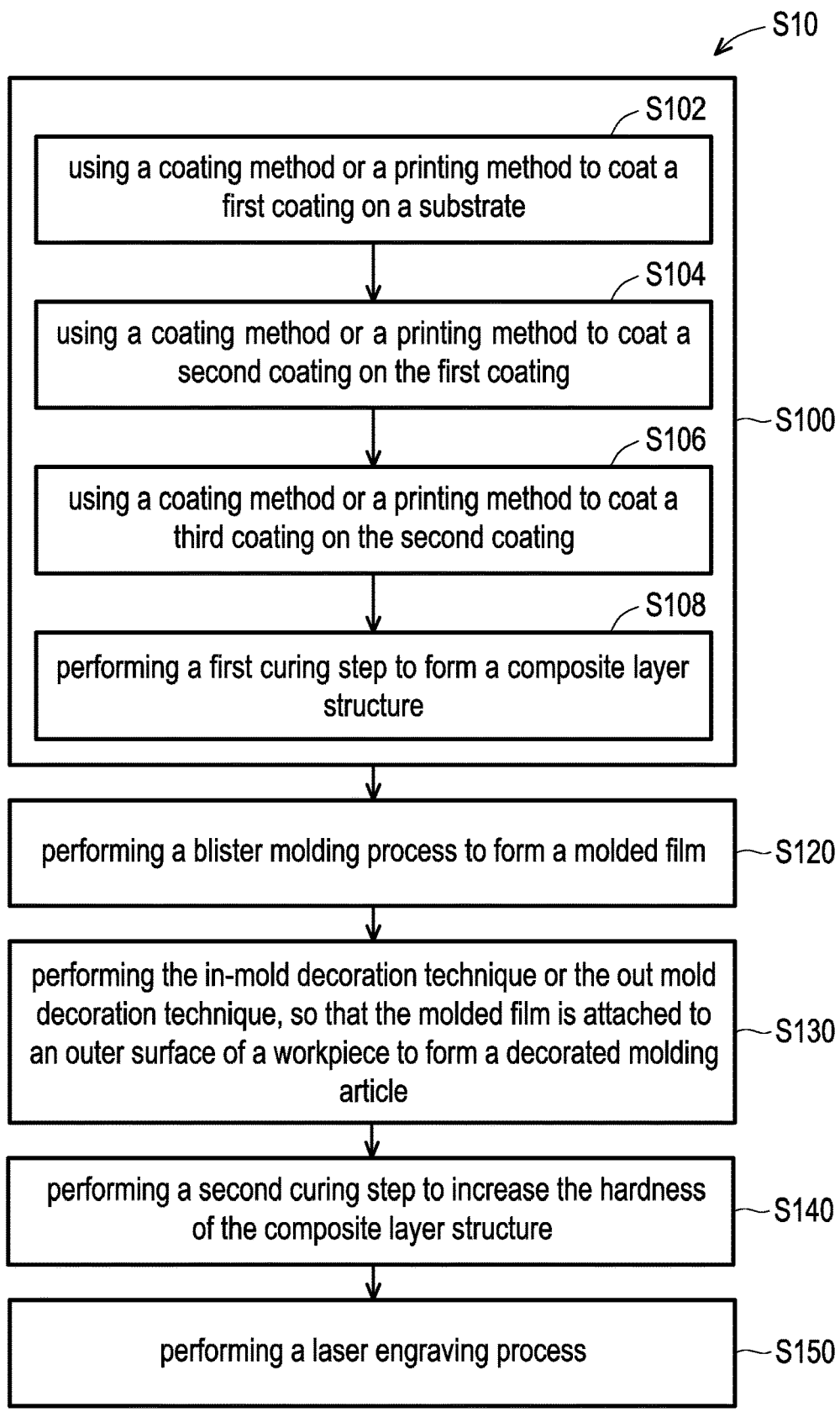
FIG. 1 is a flow chart illustrating a method of fabricating a decorated molding article according to a first embodiment of the disclosure.

In the subsequent paragraphs, the disclosure will be described holistically with reference to the accompanying drawings. However, the disclosure may be implemented in many different forms and is not limited to the embodiments illustrated in the text. Directional terminology mentioned in the following embodiments, such as such as "top", "bottom", etc., is used with reference to the orientation of the drawings being described. Therefore, the used directional terminology is only intended to illustrate, rather than limit, the disclosure. Moreover, for clarity, a thickness of each film layer and region may be enlarged. The same or similar elements will be given the same or similar reference numerals and their description will be omitted in the subsequent paragraphs.

Figure 2:
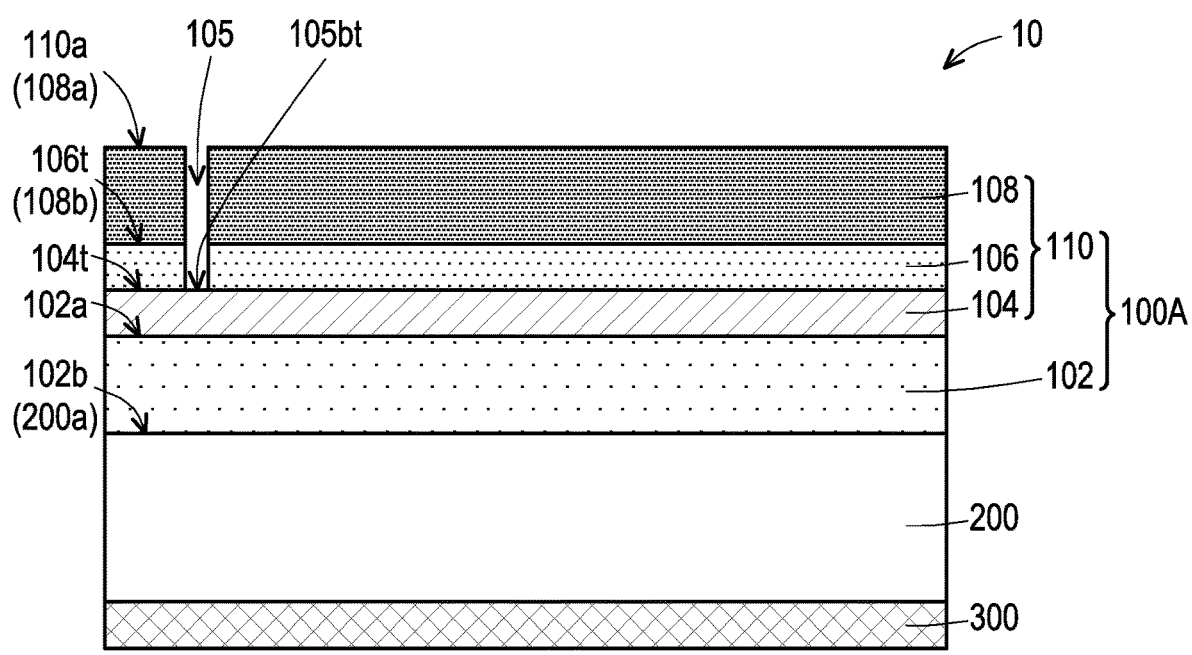
FIG. 2 is a schematic cross-sectional view of the decorated molding article according to the first embodiment of the disclosure.

FIG. 1 is a flow chart illustrating a method of fabricating a decorated molding article according to a first embodiment of the disclosure. FIG. 2 is a schematic cross-sectional view of the decorated molding article according to the first embodiment of the disclosure.

Referring to FIG. 1 and FIG. 2, the first embodiment of the disclosure provides the fabricating method S10 of a decorated molding article 10 as follows. Step S100 is performed to form a composite layer structure 110 (as shown in FIG. 2). Specifically, the step of forming the composite layer structure 110 includes steps as follows. Step S102 is performed. A coating method or a printing method is used to form a first coating on a substrate 102 (as shown in FIG. 2). In one embodiment, the material of the substrate 102 includes acrylonitrile-butadiene-styrene copolymer (ABS), polycarbonate (PC), polymethyl methacrylate (PMMA), or a combination thereof, and the method of forming the same includes extrusion molding method and so on. For example, the ABS solid plastic may be heated, melted, extruded, and cooled to form the ABS substrate 102 by an extrusion molding method. Moreover, ABS solid plastic may be mixed with color masterbatch, pigments, pearl powder, and related additives to form a mixture. Then, the mixture is extruded by an extrusion molding method to form another ABS substrate, so that the ABS substrate has visual effects such as colors, pearly luster, a bright surface, a mirror surface, a lusterless matte surface, and the like.

Specifically, in the coating method, the coating material is distributed in a coating device, and the coating material is uniformly coated on the substrate 102 through the coating head of the coating device. In an embodiment, the opening of the coating head may be flat, so that the coating material coated on the substrate 102 has a bright surface effect. In another embodiment, the opening of the coating head may have multiple microstructures (e.g., micro-dents), so that the coating material coated on the substrate 102 has a matting effect. In an alternative embodiment, the opening of the coating head may have multiple concave-convex structures, so that the coating material coated on the substrate 102 has a hairline effect. On the other hand, the printing method may include an appropriate printing method such as gravure printing method, screen printing method, offset printing method, reverse printing method, inkjet printing method, or the like. Compared with the coating method, the printing method may form a thinner film layer.

In an embodiment, the first coating at least includes a protective material, an ink material, and a bonding material which are uniformly mixed together. The protective material may include polymethyl methacrylate (PMMA), aliphatic urethane diacrylate, epoxy acrylate (EA), polyester polyol, or a combination thereof; the ink material may include polyurethane (PU) and similar materials; and the bonding material may include thermoplastic polyurethane (TPU), aromatic urethane diacrylate, or a combination thereof. Moreover, the first coating further includes a heat-resistant material, a solvent, and a hardener. In an embodiment, the heat-resistant material may include polycarbonate (PC) and similar materials; the solvent may include ethyl acetate, methyl ethyl ketone, toluene, xylene, or a combination thereof; and the hardener may include polyisocyanate and similar materials. However, the disclosure is not limited thereto. In other embodiments, the first coating may also include other additives, such as matting powder, pearl powder, and the like, so that a first decoration layer 104 (as shown in FIG. 2) formed in the subsequent process has different visual effects such as a matte surface and pearly luster.

Then, proceed to step S104. A second coating is formed on the first coating by using a coating method or a printing method. In one embodiment, the second coating includes at least a protective material, an ink material, and a bonding material uniformly mixed together. Moreover, the coating method, printing method, protective material, ink material, and bonding material have been illustrated in detail in the foregoing paragraphs, which are not iterated herein. Note that the first coating is used to form the first decoration layer 104, and the second coating is used to form a second decoration layer 106 as shown in FIG. 2. In the embodiment, the first coating and the second coating have different compositions to achieve different visual effects. In another embodiment, the decoration layers 104 or 106 may also use evaporation or sputtering to achieve a metalized decoration effect. For example, the first decoration layer 104 formed by the first coating may be a wood grain layer, and the second decoration layer 106 formed by the second coating may have a matte silver color, so that the composite layer structure 110 exhibits a matte silver color in a wood grain pattern.

Then, proceed to step S106. A third coating is formed on the second coating by using a coating method or a printing method. In one embodiment, the third coating includes at least a protective material, an ink material, and a bonding material uniformly mixed together. Moreover, the coating method, printing method, protective material, ink material, and bonding material have been illustrated in detail in the foregoing paragraphs, which are not iterated herein. Note that the third coating is used to form an optical hardening layer 108. In the embodiment, the content of the protective material in the third coating may be higher than the content of the protective material in the first coating or the second coating.

Subsequently, proceed to step S108. A first curing step is performed to form the composite layer structure 110. As shown in FIG. 2, the composite layer structure 110 includes the first decoration layer 104, the second decoration layer 106, and the optical hardening layer 108. The first decoration layer 104 may be disposed on a first surface 102a of the substrate 102. The second decoration layer 106 may be disposed on the first decoration layer 104. The optical hardening layer 108 may be disposed on the second decoration layer 106 such that the second decoration layer 106 is disposed between the first surface 102a of the substrate 102 and the optical hardening layer 108. Although only two decoration layers 104 and 106 are illustrated in FIG. 2, the disclosure is not limited thereto. In other embodiments, the composite layer structure 110 may also have multiple (e.g., three, four, or more layers) stacked decoration layers.

In an embodiment, the first curing step may include a thermal curing step, an ultraviolet (UV) curing step, a combination thereof, or other suitable curing steps. This first curing step may cause the bonding material to undergo a cross-linking reaction and be bonded to the substrate 102. In the embodiment, the coating material may be regarded as an all-in-one coating material, which allows the cured composite layer structure 110 to have a protective effect, a color effect, and a bonding effect altogether. In this case, the composite layer structure 110 may also be referred to as an all-in-one composite layer structure. Compared with the steps in which the purchase of a protective layer is required and an adhesive film structure is formed through a printing and bonding process in the prior art, the disclosure may effectively facilitate the fabricating steps, reduce the fabricating cost, and prevent the pollution problems caused by the adhesive film.

After the composite layer structure 110 is formed, proceed to step S120. A blister molding process is performed to form a molded film 100A. In one embodiment, the blister molding process includes heating the composite layer structure 110 and the substrate 102 to soften the composite layer structure 110 and the substrate 102; putting the softened composite layer structure 110 and the substrate 102 into a mold and pressurizing them, so that the softened composite layer structure 110 and the substrate 102 are molded into a desired shape; performing a cooling step; and cutting the excess part to form the molded film 100A.

Then, proceed to step S130. The in-mold decoration technique or the out mold decoration technique are performed, so that the molded film 100A is attached to an outer surface 200a of a workpiece 200 to form the decorated molding article 10 as shown in FIG. 2. In one embodiment, the substrate 102 has a first surface 102a and a second surface 102b opposite to each other. As shown in FIG. 2, the second surface 102b of the substrate 102 is in contact with the outer surface 200a of the workpiece 200, the first surface 102a of the substrate 102 is in contact with the first decoration layer 104, and a top surface 110a of the composite layer structure 110 is exposed upward. In the embodiment, the top surface 110a of the composite layer structure 110 may be a visual surface, so that consumers may oversee the visual effect of the molded film 100A from the top surface 110a of the composite layer structure 110.

Figure 9:
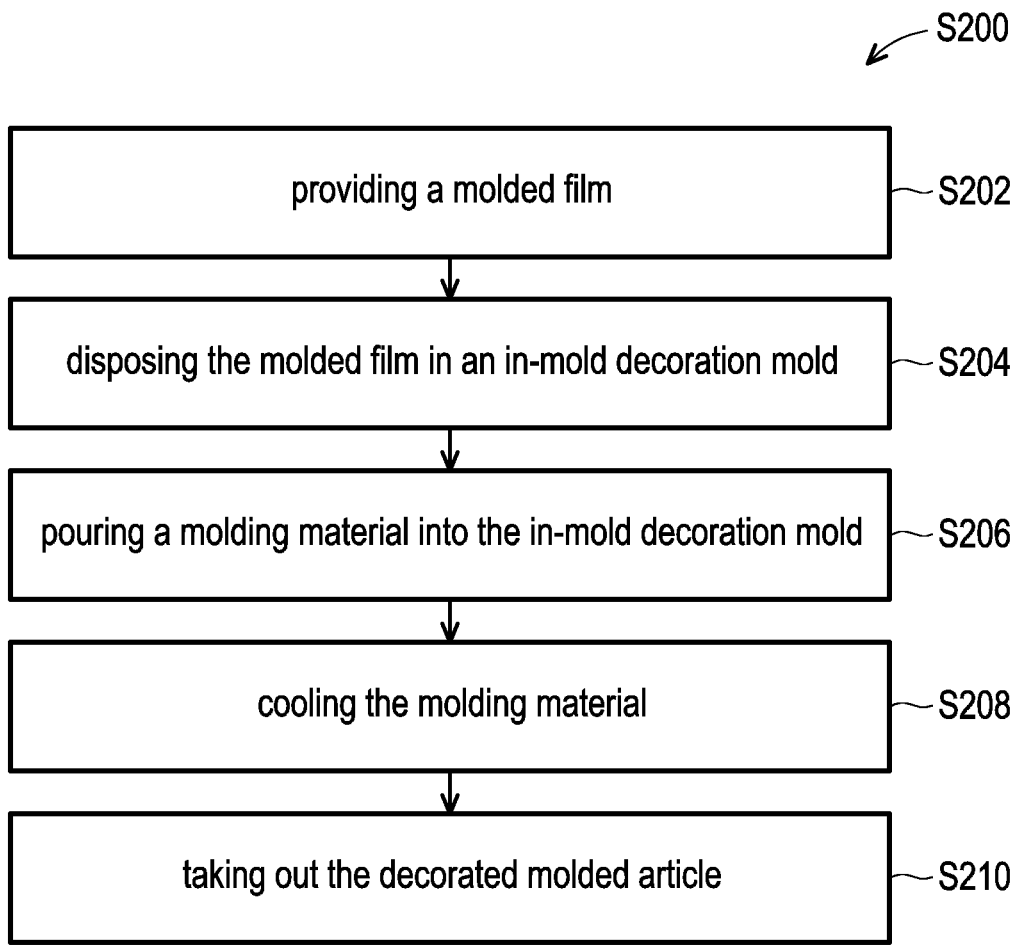
FIG. 9 is a flow chart illustrating an in-mold decoration technique according to an embodiment of the disclosure.
Figure 10:
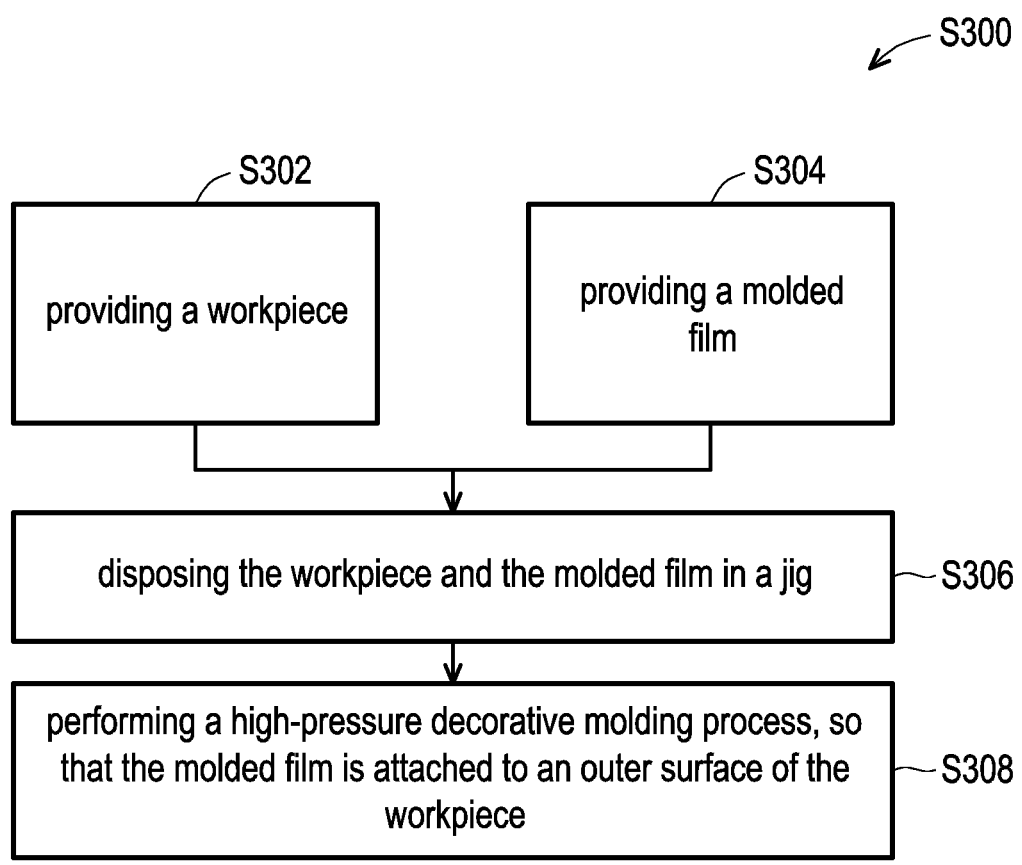
FIG. 10 is a flow chart illustrating an out mold decoration technique according to an embodiment of the disclosure.

FIG. 9 is a flow chart illustrating an in-mold decoration technique according to an embodiment of the disclosure. FIG. 10 is a flow chart illustrating an out mold decoration technique according to an embodiment of the disclosure.

Referring to FIG. 9, the step S200 of the in-mold decoration technique is illustrated as follows. First, step S202 is performed to provide a molded film. This molded film may be the molded film 100A, for example. The composition of the molded film 100A has been illustrated in the foregoing paragraphs, which is not iterated herein.

Next, proceed to step S204. The molded film 100A is disposed in the in-mold decoration mold. Specifically, the in-mold decoration mold includes a hollow mold cavity. The mold cavity has a surface. Subsequently, the molded film 100A is attached to the surface of the mold cavity so that the molded film 100A covers at least a part of the surface of the mold cavity. In an alternative embodiment, before step S206, a heating pre-forming process may be selectively performed and the excess film may be removed by die cutting, laser cutting, or waterjet cutting.

Then, proceed to step S206. The molding material is poured into the mold cavity of the in-mold decoration mold, so that the molding material and the molded film 100A are combined with each other. In one embodiment, the molding material may be suitable for molding, such as plastic material, resin material, metal material, carbon fiber material, glass, and the like.

Subsequently, proceed to step S208. The molding material is cooled to form the workpiece 200. The workpiece 200, subject to the application of the decorated molding article of the disclosure, may be an electronic device housing or component, a vehicle housing or component, or a combination thereof. For example, the workpiece 200 may be mobile phones, digital cameras, personal digital assistants (PDAs), laptop computers, desktop computers, touch panels, TVs, satellite positioning system (GPS) devices, car monitors, navigation devices, displays, digital photo frames, DVD players, automotive interior trim panels (e.g. handles, trim strips, touch front bumpers, and the like), car exterior decorative panels (e.g. exterior handles, back door decorative strips, and the like), car dashboards, car logos, intelligent keys (I-key), engine start buttons, clocks, radios, toys, watches, or other housings or components used in electronic products that require power. However, the disclosure does not limit the shape and structure of the workpiece 200, and as long as the shape and structure of the workpiece 200 may be implemented by the in-mold decoration technique, they are within the scope of the disclosure.

Next, proceed to step S210. The decorated molding article 10 is taken out from the in-mold decoration mold. The obtained decorated molding article 10 has been illustrated in detail in FIG. 2, which is not iterated herein.

On the other hand, the decorated molding article 10 may also be fabricated by out mold decoration technique. Referring to FIG. 10, the step S200 of the out mold decoration technique is illustrated as follows. First, step S302 is performed to provide the workpiece 200. In an embodiment, the workpiece 200, subject to the application of the decorated molding article of the disclosure, may be an electronic device housing or component, a vehicle housing or component, or a combination thereof. In an alternative embodiment, the material of the outer surface 200a of the workpiece 200 may be plastic, resin, metal, carbon fiber, glass, or other various shell materials that have been formed, and for example, the workpiece may be fabricated with the required characteristics after a proper pre-treatment process. For example, when the material of the workpiece is plastic, a plastic workpiece (e.g. a plastic housing and the like) may be obtained through an injection molding mold by an injection molding process, or when the material of the workpiece is metal, a metal workpiece (e.g. a metal housing and the like) may be obtained after the metal is surface treated.

Next, proceed to step S304. A molded film is provided. For example, the molded film may be the molded film 100A shown in FIG. 2. The composition of the molded film 100A has been illustrated in the foregoing paragraphs, which is not iterated herein.

Subsequently, proceed to step S306. The workpiece 200 and the molded film 100A are disposed in a jig. Note that before step S306, the jig may be selectively designed according to the requirements of the final product, and the jig may be prepared.

Then, proceed to step S308. A high-pressure decorative molding process is performed, so that the molded film 100A is attached to the outer surface 200a of the workpiece 200. Specifically, in the high-pressure decorative molding process, a heating and softening step is first performed on the molded film 100A, for example. In one embodiment, the temperature of the heating and softening step may range from 80° C. to 150° C.; the time of the heating and softening step may range from 30 seconds to 180 seconds. Next, the molded film 100A is brought into contact with the workpiece 200, and a pressing step is performed. Subsequently, a high-pressure vacuum forming step is performed on the molded film 100A, so that the molded film 100A is attached to the workpiece 200. Finally, the remaining composite layer structure is removed selectively by die cutting, laser cutting, or waterjet cutting. In short, in the embodiment, the molded film 100A may be tightly attached to a part of the outer surface 200a of the workpiece 200 by the out mold decoration technique.

Referring to FIG. 1 again, after the decorated molding article 10 is formed, proceed to step S140. A second curing step is performed to increase the hardness of the composite layer structure 110. In an embodiment, the second curing step may include a thermal curing step, an ultraviolet (UV) curing step, a combination thereof, or other suitable curing steps. In the embodiment, the first curing step is different from the second curing step. For example, the first curing step may be a thermal curing step, and the second curing step may be a UV curing step, and vice versa. In an alternative embodiment, when the first curing step and the second curing step are both thermal curing steps, the curing temperature of the second curing step may be higher than the curing temperature of the first curing step. Note that this second curing step may cause the protective material to undergo a cross-linking reaction, so as to increase the hardness of a top surface 108a of the optical hardening layer 108, thereby enhancing the protective effect. That is, when performing the in-mold decoration or the out mold decoration technique (i.e., step S130), the optical hardening layer 108 is not yet completely cured and has ductility, and thereby it is completely attached to the outer surface 200a of the workpiece 200. After the second curing step (i.e., step S140), the optical hardening layer 108 is completely cured and has an overall protective effect. In the embodiment, the hardness of the optical hardening layer 108 may have a gradient change. Specifically, the hardness of the optical hardening layer 108 may increase from the bottom surface 108b toward the top surface 108a. That is, the hardness of the top surface 108a of the optical hardening layer 108 may be greater than the hardness of the bottom surface 108b of the optical hardening layer 108. Moreover, the second curing step may also increase the hardness of the first decoration layer 104 and the second decoration layer 106 to facilitate the subsequent laser engraving process (i.e., step S150).

Then, proceed to step S150. A laser engraving process is performed to form a groove 105 in the composite layer structure 110. As shown in FIG. 2, the groove 105 may extend downward from the top surface 110a of the composite layer structure 110 to expose a top surface 104t of the first decoration layer 104. However, the disclosure is not limited thereto. In other embodiments, the groove 105 may also have different depths. That is, a bottom surface 105bt of the groove 105 may be higher or lower than the top surface 104t of the first decoration layer 104, or the bottom surface 105bt of the groove 105 may be higher than, lower than, or equal to a top surface 106t of the second decoration layer 106. Moreover, although only one groove 105 is illustrated in FIG. 2, the disclosure is not limited thereto. In an alternative embodiment, the decorated molding article 10 may have multiple grooves to form various laser engraved patterns, and thereby improving the visual perception of consumers.

Next, referring to FIG. 2, the decorated molding article 10 may be disposed on a light source 300 to emit light of various colors through the groove 105. For example, the light source 300 may be blue light, and the first decoration layer 104 may be a wood grain layer. When the light source 300 is off, the consumer may see a laser engraved pattern with wood grain effect from the visual surface 110a through the groove 105. On the other hand, when the light source 300 is on, the consumer may see a laser engraved pattern with the blue wood grain effect from the visual surface 110a through the groove 105. In an embodiment, the light source 300 may include an LED point light source, an LED light bar, a mini LED, and the like.

In the conventional spraying technology, multiple spraying steps and multiple laser engraving steps are required to form a multi-color film. The technology has disadvantages of complicated fabricating process, difficult processing, high cost, and heavy environmental pollution. Moreover, in the conventional decoration process (e.g. IMD or OMD), a hollow printing method is usually used to form the multi-color film. However, this technology may have disadvantages, such as difficult alignment, low yield, excessive material consumption, and high cost after the client undergoes processes such as blister molding, cutting, and injection molding. Moreover, the IMD film or the OMD film is relatively thin, which does not benefit the laser engraving process. That is, even if the laser engraving process is performed, the laser engraved film may peel off or be damaged due to poor physical properties of the surface, and accordingly an additional protective coating is required to protect the film, leading to an increase of the cost.

To solve the problems, in the embodiment of the disclosure, an all-in-one coating is formed on a substrate, a curing step is performed, and thereby a composite layer structure with a protective effect, a color effect, and a bonding effect is formed. The composite layer structure may form a molded film with better physical properties (e.g., higher hardness, better protection effect, and the like) after the blister molding process. Therefore, the molded film of the embodiment may be applied in a laser engraving process to form a variety of light-transmitting decorated molding articles.

Figure 3:
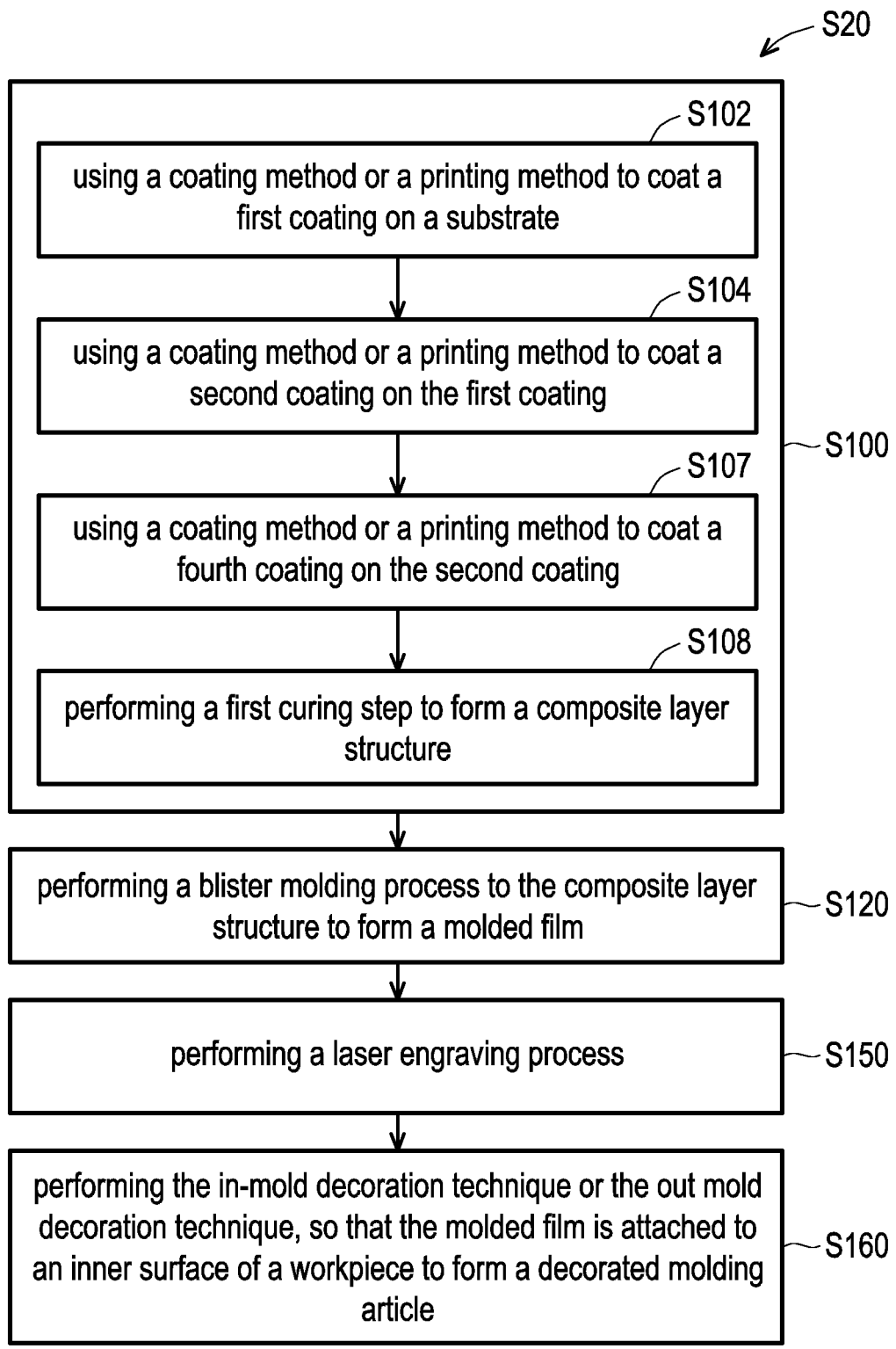
FIG. 3 is a flow chart illustrating a method of fabricating a decorated molding article according to a second embodiment of the disclosure.
Figure 4:
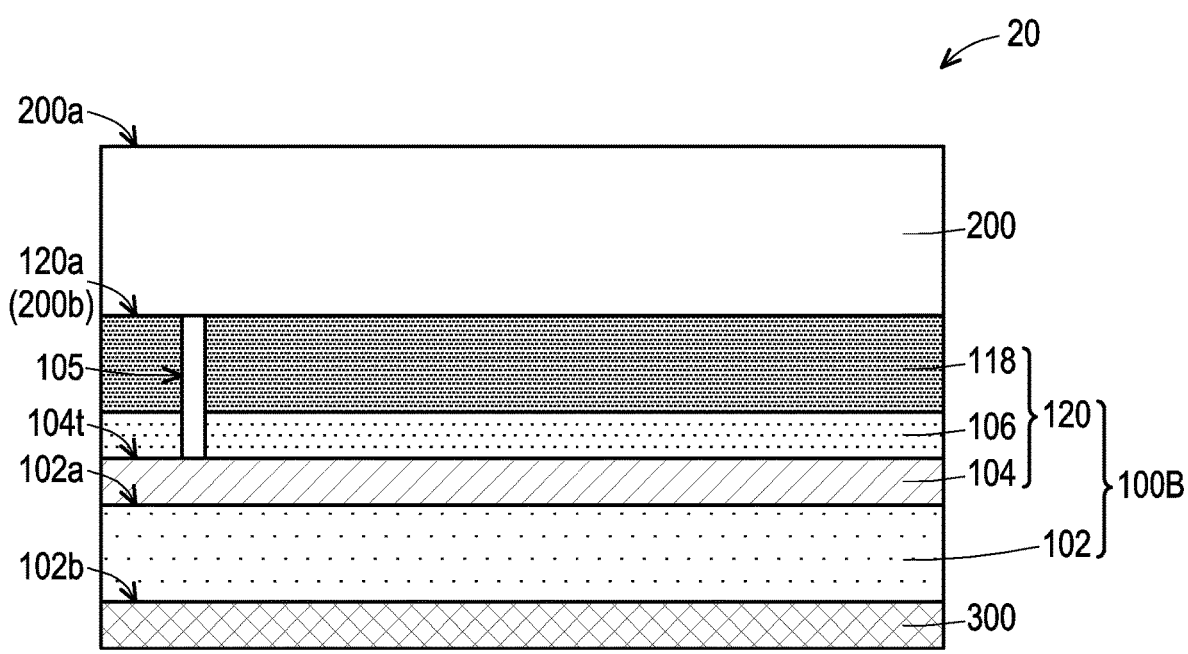
FIG. 4 is a schematic cross-sectional view of the decorated molding article according to the second embodiment of the disclosure.

FIG. 3 is a flow chart illustrating a method of fabricating a decorated molding article according to a second embodiment of the disclosure. FIG. 4 is a schematic cross-sectional view of the decorated molding article according to the second embodiment of the disclosure.

Referring to FIG. 3 and FIG. 4, the second embodiment of the disclosure provides the method S20 for fabricating a decorated molding article 20 as follows. Step S100 is performed to form a composite layer structure 120 (as shown in FIG. 4). Specifically, forming the composite layer structure 120 includes performing step S102 to form the first coating on the substrate 102 by using a coating method or a printing method (as shown in FIG. 4). Then, step S104 is performed to form the second coating on the first coating by using a coating method or a printing method. Then, step S107 is performed to form a fourth coating on the second coating by using a coating method or a printing method. In an embodiment, the fourth coating at least includes a protective material, an ink material, and a bonding material uniformly mixed together. Moreover, the coating method, printing method, protective material, ink material, and bonding material have been illustrated in detail in the foregoing paragraphs, which are not iterated herein. Note that the fourth coating is used to form an anti-impact adhesive layer 118 (as shown in FIG. 4). In the embodiment, the content of the bonding material in the fourth coating may be higher than the content of the bonding material in the first coating or the second coating, so as to increase the adhesion between the composite layer structure 120 and the subsequently formed workpiece 200 to form the composite layer structure 120. As shown in FIG. 4, the composite layer structure 120 includes the first decoration layer 104, the second decoration layer 106, and the anti-impact adhesive layer 118. The first decoration layer 104 may be disposed on the first surface 102a of the substrate 102. The second decoration layer 106 may be disposed on the first decoration layer 104. The anti-impact adhesive layer 118 may be disposed on the second decoration layer 106 so that the second decoration layer 106 is disposed between the first surface 102a of the substrate 102 and the anti-impact adhesive layer 118.

After the composite layer structure 120 is formed, proceed to step S120. A blister molding process is performed to form a molded film 100B.

Then, proceed to step S150. A laser engraving process is performed to form the groove 105 in the composite layer structure 120. As shown in FIG. 4, the groove 105 may extend downward from the top surface 120a of the composite layer structure 120 to expose the top surface 104t of the first decoration layer 104. However, the disclosure is not limited thereto. In other embodiments, the groove 105 may also have different depths.

Subsequently, proceed to step S160. The in-mold decoration technique or the out mold decoration technique is performed, so that the molded film 100B is attached to the inner surface 200b of the workpiece 200 to form the decorated molding article 20 as shown in FIG. 4. Specifically, the inner surface 200b of the workpiece 200 is in contact with the top surface 120a of the composite layer structure 120 to seal the groove 105. In the embodiment, the outer surface 200a of the workpiece 200 may be a visual surface, so that consumers may oversee the visual effect of the molded film 100B from the outer surface 200a of the workpiece 200 which has a deep crystal-like thickness texture. Moreover, the in-mold decoration and the out mold decoration technique have been illustrated in detail in the foregoing paragraphs, which are not iterated herein.

Figure 5:
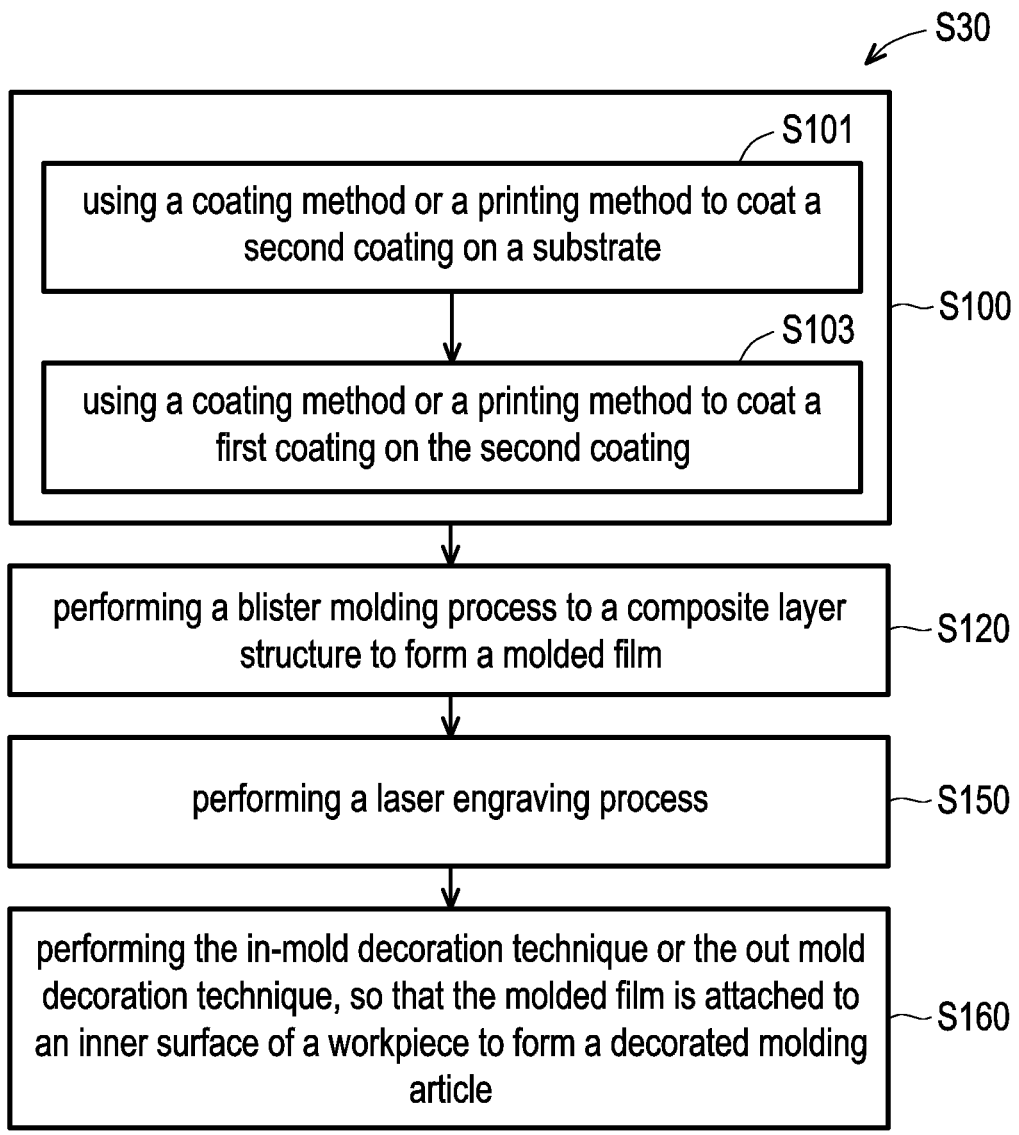
FIG. 5 is a flow chart illustrating a method of fabricating a decorated molding article according to a third embodiment of the disclosure.
Figure 6:
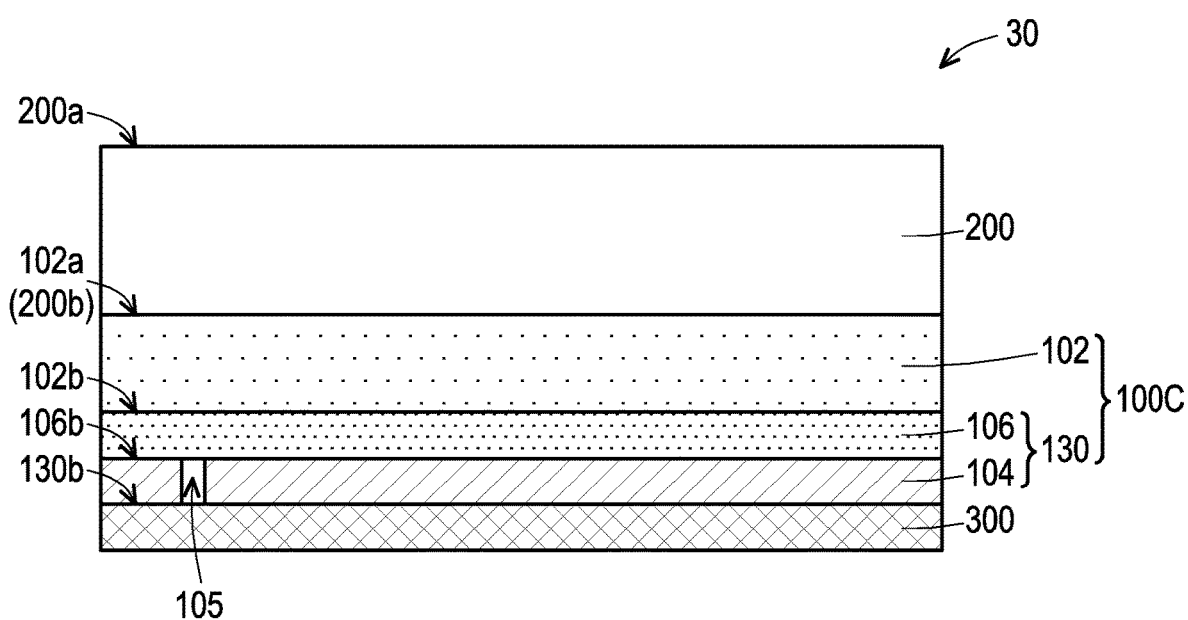
FIG. 6 is a schematic cross-sectional view of the decorated molding article according to the third embodiment of the disclosure.

FIG. 5 is a flow chart illustrating a method of fabricating a decorated molding article according to a third embodiment of the disclosure. FIG. 6 is a schematic cross-sectional view of the decorated molding article according to the third embodiment of the disclosure.

Referring to FIG. 5 and FIG. 6, the third embodiment of the disclosure provides the method S30 of fabricating a decorated molding article 30 as follows. Step S100 is performed to form a composite layer structure 130 (as shown in FIG. 6). Specifically, forming the composite layer structure 130 includes performing step S101 to coat the second coating on the substrate (as shown in FIG. 6) by using a coating method or a printing method. Then, step S103 is performed to coat the first coating on the second coating by using a coating method or a printing method. In one embodiment, the first coating is used to form the first decoration layer 104, and the second coating is used to form the second decoration layer 106 as shown in FIG. 6. In the embodiment, the first coating and the second coating do not require additional curing steps (i.e., at room temperature) to form the first decoration layer 104 and the second decoration layer 106, and therefore the composite layer structure 130 is formed. As shown in FIG. 6, the composite layer structure 130 includes the first decoration layer 104 and the second decoration layer 106. The second decoration layer 106 may be disposed on the second surface 102b of the substrate 102. The first decoration layer 104 may be disposed under the second decoration layer 106 so that the second decoration layer 106 is sandwiched between the second surface 102b of the substrate 102 and the first decoration layer 104.

After the composite layer structure 130 is formed, proceed to step S120. A blister molding process is performed to form a molded film 100C.

Then, proceed to step S150. A laser engraving process is performed to form the groove 105 in the composite layer structure 130. As shown in FIG. 6, the groove 105 may extend upward from a bottom surface 130b of the composite layer structure 130 to expose a bottom surface 106b of the second decoration layer 106. However, the disclosure is not limited thereto. In other embodiments, the groove 105 may also have different depths.

Subsequently, proceed to step S160. The in-mold decoration technique or the out mold decoration technique is performed, so that the molded film 100C is attached to the inner surface 200b of the workpiece 200 to form the decorated molding article 30 as shown in FIG. 6. Specifically, the inner surface 200b of the workpiece 200 is in contact with the first surface 102a of the substrate 102. The light source 300 is in contact with the bottom surface 130b of the composite layer structure 130 to seal the groove 105. In the embodiment, the outer surface 200a of the workpiece 200 may be a visual surface, so that consumers may oversee the visual effect of the molded film 100C from the outer surface 200a of the workpiece 200. Moreover, the in-mold decoration and the out mold decoration technique have been illustrated in detail in the foregoing paragraphs, which are not iterated herein.

In the embodiment, as shown in FIG. 6, the decorated molding article 30 may emit light of various colors through the groove 105. For example, the light source 300 may be blue light, and the second decoration layer 106 may be a geometric pattern layer. When the light source 300 is off, the consumer may see the entire geometric pattern from the visual surface 200a. On the other hand, when the light source 300 is on, the consumer may see the laser engraved pattern with the blue geometric pattern effect from the visual surface 200a through the groove 105.

Figure 7:
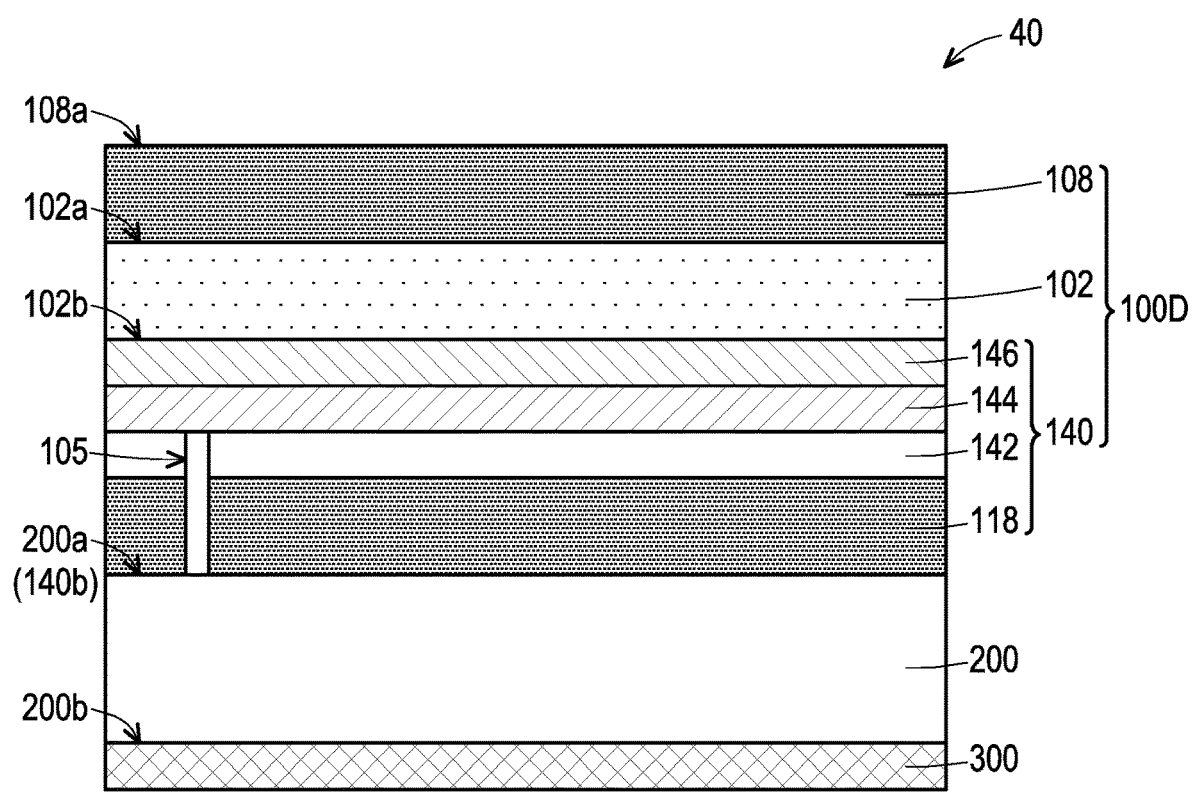
FIG. 7 is a schematic cross-sectional view of a decorated molding article according to a fourth embodiment of the disclosure.

FIG. 7 is a schematic cross-sectional view of a decorated molding article according to a fourth embodiment of the disclosure.

Referring to FIG. 7, a decorated molding article 40 of the fourth embodiment may include the workpiece 200 and a molded film 100D. The molded film 100D may be disposed on the outer surface 200a of the workpiece 200, and the light source 300 may be disposed on the inner surface 200b of the workpiece 200. Specifically, the molded film 100D may include the substrate 102, the optical hardening layer 108, and the composite layer structure 140. The substrate 102 has the first surface 102a and a second surface 102b opposite to each other. The optical hardening layer 108 may be disposed on the first surface 102a of the substrate 102. In the embodiment, the optical hardening layer 108 may be formed of the third coating, and the content of the protective material may be higher than the content of the protective material in the first coating or the second coating. In the embodiment, the optical hardening layer 108 may also be referred to as an all-in-one hard coating. In the embodiment, the top surface 108a of the optical hardening layer 108 may be a visual surface, so that consumers may oversee the visual effect of the molded film 100D from the top surface 108a of the optical hardening layer 108.

Moreover, the composite layer structure 140 may be disposed on the second surface 102b of the substrate 102. Specifically, from bottom to top, the composite layer structure 140 may sequentially include the anti-impact adhesive layer 118, a buffer layer 142 (or decoration layer), a third decoration layer 144, and a fourth decoration layer 146. In the embodiment, the anti-impact adhesive layer 118 may be formed of the fourth coating, and the content of the bonding material may be higher than the content of the bonding material in the first coating or the second coating. In one embodiment, the material of the buffer layer 142 includes polyurethane (PU) and polymethyl methacrylate (PMMA), which have the effect of preventing ink wash-off and improving the laser engraving resolution. In one embodiment, the third decoration layer 144 may be formed of the first coating, which may be printed in a single time or multiple times to present different decorative patterns such as wood grain and geometric patterns. In one embodiment, the fourth decoration layer 146 may be formed of the second coating, which may be formed on the second surface 102b of the substrate 102 by a physical vapor deposition method (e.g., an evaporation method, a sputtering method, and the like.), an electroplating method, and the like. For example, the third decoration layer 144 may be a wood grain layer, and the fourth decoration layer 146 may have a vapor-deposited metal layer with a transparency of 50%, so that the composite layer structure 140 exhibits a wood grain pattern with a metallic color with a transparency of 50%. Moreover, although only two decoration layers 144 and 146 are illustrated in FIG. 7, the disclosure is not limited thereto. In other embodiments, multiple decoration layers stacked alternately may be formed according to the requirements of different effects.

Note that the decorated molding article 40 further includes the groove 105 formed in the anti-impact adhesive layer 118 and the buffer layer 142. However, the disclosure is not limited thereto. In other embodiments, the groove 105 may also have different depths. That is, the groove 105 may also extend upward into the third decoration layer 144 and/or the fourth decoration layer 146. The bottom surface 140b of the composite layer structure 140 may be in contact with the outer surface 200a of the workpiece 200 to seal the groove 105.

In the embodiment, as shown in FIG. 7, the decorated molding article 40 may emit light of various colors through the groove 105. For example, the light source 300 may be blue light, and the fourth decoration layer 146 may be a vapor-deposited metal layer with a transparency of 50%. When the light source 300 is off, the consumer may see the entire vapor-deposited metal layer from the visual surface 108a. On the other hand, when the light source 300 is on, the consumer may see the laser engraved pattern with blue metal effect from the visual surface 108a through the groove 105.

Figure 8:
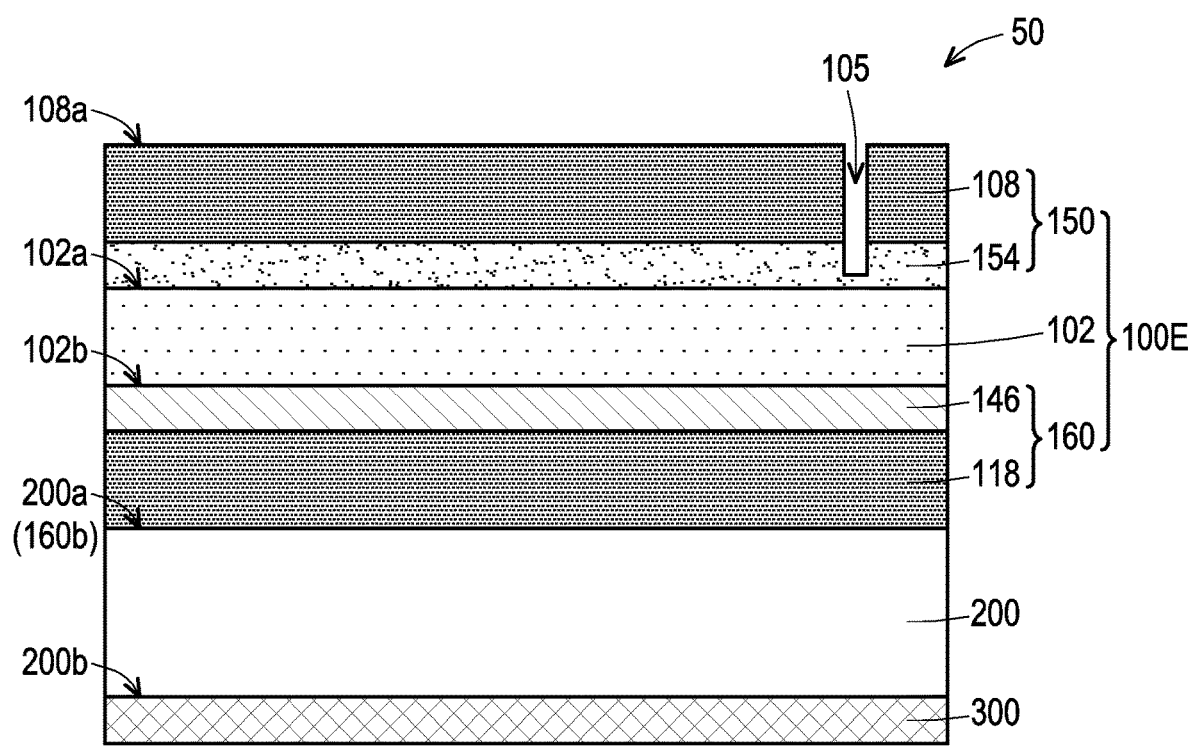
FIG. 8 is a schematic cross-sectional view of a decorated molding article according to a fifth embodiment of the disclosure.

FIG. 8 is a schematic cross-sectional view of a decorated molding article according to a fifth embodiment of the disclosure.

Referring to FIG. 8, a decorated molding article 50 of the fifth embodiment may include the workpiece 200 and a molded film 100E. The molded film 100E may be disposed on the outer surface 200a of the workpiece 200, and the light source 300 may be disposed on the inner surface 200b of the workpiece 200. Specifically, the molded film 100E may include the substrate 102, a first composite layer structure 150, and a second composite layer structure 160. The substrate 102 has the first surface 102a and the second surface 102b opposite to each other. The first composite layer structure 150 may be disposed on the first surface 102a of the substrate 102. The first composite layer structure 150 may include the optical hardening layer 108 and a light-transmitting layer 154. The material of the light-transmitting layer 154 includes poly methacrylic resin, which has a decoration layer effect with chemical resistance. The light-transmitting layer 154 may be in contact with the first surface 102a of the substrate 102, and the optical hardening layer 108 is disposed on the light-transmitting layer 154. In the embodiment, the top surface 108a of the optical hardening layer 108 may be a visual surface, so that consumers may oversee the visual effect of the molded film 100E from the top surface 108a of the optical hardening layer 108.

Moreover, the second composite layer structure 160 may be disposed on the second surface 102b of the substrate 102. Specifically, the second composite layer structure 160 may include the anti-impact adhesive layer 118 and the fourth decoration layer 146. The fourth decoration layer 146 may be in contact with the second surface 102b of the substrate 102, and the anti-impact adhesive layer 118 may be disposed under the fourth decoration layer 146, so that the fourth decoration layer 146 is sandwiched between the second surface 102b of the substrate 102 and the anti-impact adhesive layer 118. In the embodiment, the fourth decoration layer 146 may be formed of the second coating, which may be formed on the second surface 102b of the substrate 102 by a physical vapor deposition method (e.g., an evaporation method, a sputtering method, and the like), an electroplating method, and the like. For example, the light-transmitting layer 154 may be a semi-transparent black layer, and the fourth decoration layer 146 may have a vapor-deposited metal layer with a transparency of 25%, so that the molded film 100E exhibits a black metallic color with a transparency of 25%.

Note that the decorated molding article 50 further includes the groove 105 formed in the first composite layer structure 150. That is, the groove 105 extends downward from the top surface 108a of the optical hardening layer 108 into the light-transmitting layer 154. The bottom surface 160b of the second composite layer structure 160 may be in contact with the outer surface 200a of the workpiece 200 so as to be attached to the outer surface 200a of the workpiece 200 through the anti-impact adhesive layer 118.

Figure 11:
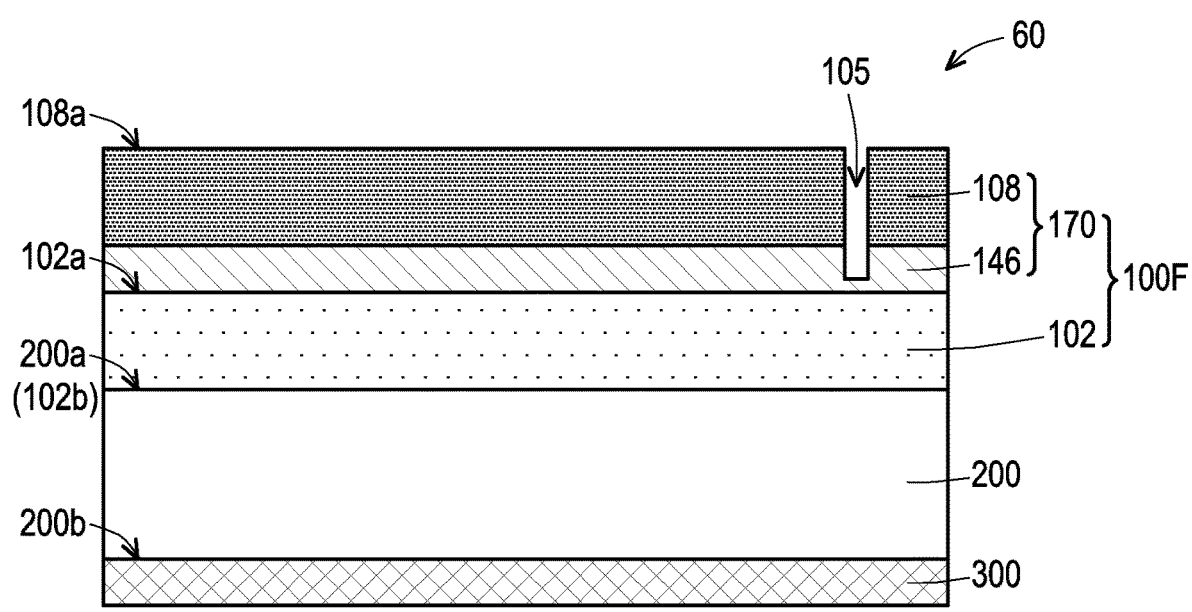
FIG. 11 is a schematic cross-sectional view of a decorated molding article according to a sixth embodiment of the disclosure.

FIG. 11 is a schematic cross-sectional view of a decorated molding article according to a sixth embodiment of the disclosure.

Referring to FIG. 11, a decorated molding article 60 of the sixth embodiment may include the workpiece 200 and a molded film 100F. The molded film 100F may be disposed on the outer surface 200a of the workpiece 200, and the light source 300 may be disposed on the inner surface 200b of the workpiece 200. Specifically, the molded film 100F may include the substrate 102 and a composite layer structure 170. The substrate 102 has the first surface 102a and the second surface 102b opposite to each other. The composite layer structure 170 may be disposed on the first surface 102a of the substrate 102. The composite layer structure 170 may include the fourth decoration layer 146 and the optical hardening layer 108. The fourth decoration layer 146 may be in contact with the first surface 102*a* of the substrate 102, and the optical hardening layer 108 is disposed on the fourth decoration layer 146. In the embodiment, the top surface 108*a* of the optical hardening layer 108 may be a visual surface, so that consumers may oversee the visual effect of the molded film 100F from the top surface 108*a* of the optical hardening layer 108. In the embodiment, the fourth decoration layer 146 may be formed of the second coating, which may be formed on the first surface 102*a* of the substrate 102 by a physical vapor deposition method (e.g., an evaporation method, a sputtering method, and the like), an electroplating method, and the like. The optical hardening layer 108 may have a protective effect to prevent the fourth decoration layer 146 from being scratched or damaged.

Note that a decorated molding article 60 further includes the groove 105 formed in the composite layer structure 170. That is, the groove 105 extends downward from the top surface 108*a* of the optical hardening layer 108 into the fourth decoration layer 146.

Figure 12A:
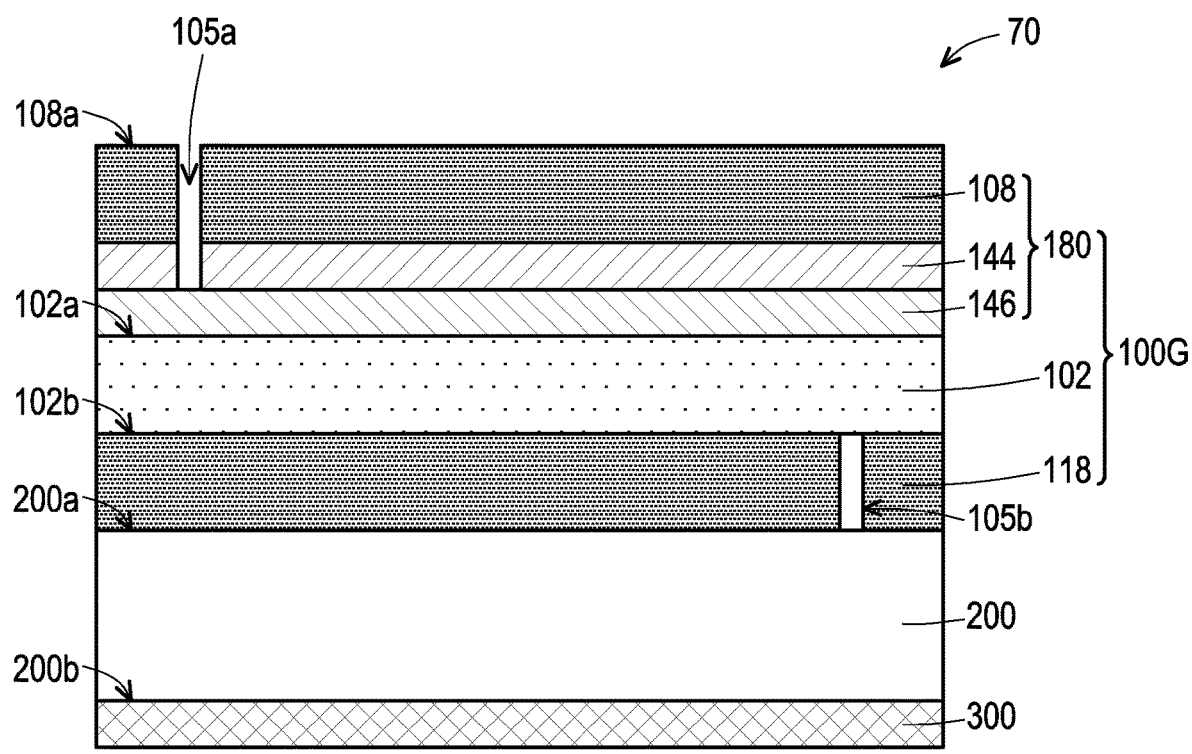
FIG. 12A is a schematic cross-sectional view of a decorated molding article according to a seventh embodiment of the disclosure.
Figure 12B:
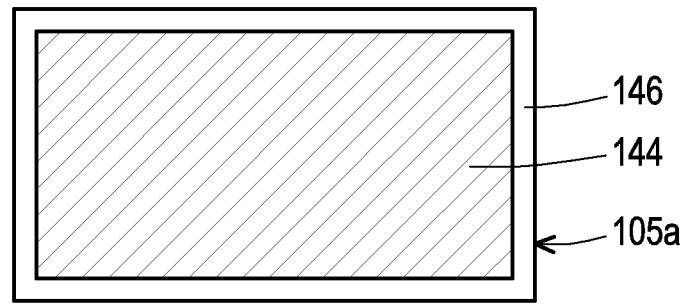
FIG. 12B and FIG. 12C are schematic top views of the structure of FIG. 12A when the light source is off and when the light source is on, respectively.
Figure 12C:
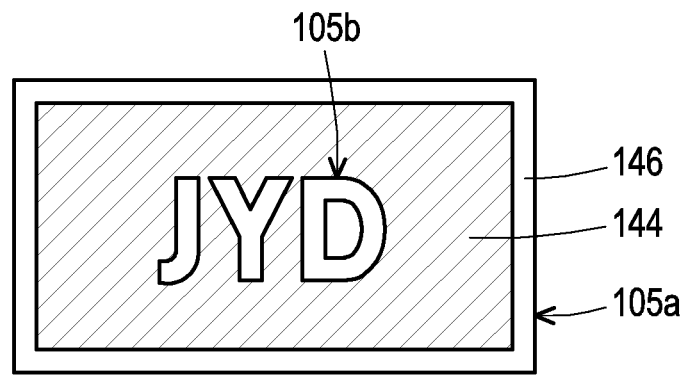

FIG. 12A is a schematic cross-sectional view of a decorated molding article according to a seventh embodiment of the disclosure. FIG. 12B and FIG. 12C are schematic top views of the structure of FIG. 12A when the light source is off and when the light source is on, respectively.

Referring to FIG. 12A, a decorated molding article 70 of the seventh embodiment may include the workpiece 200 and a molded film 100G. The molded film 100G may be disposed on the outer surface 200*a* of the workpiece 200, and the light source 300 may be disposed on the inner surface 200*b* of the workpiece 200. Specifically, the molded film 100G may include the substrate 102, a composite layer structure 180, and the anti-impact adhesive layer 118. The substrate 102 has the first surface 102*a* and a second surface 102*b* opposite to each other. The composite layer structure 180 may be disposed on the first surface 102*a* of the substrate 102. The composite layer structure 180 may include the third decoration layer 144, the fourth decoration layer 146, and the optical hardening layer 108. The fourth decoration layer 146 may be in contact with the first surface 102*a* of the substrate 102. The optical hardening layer 108 may be disposed on the fourth decoration layer 146. The third decoration layer 144 may be disposed between the fourth decoration layer 146 and the optical hardening layer 108. In the embodiment, the top surface 108*a* of the optical hardening layer 108 may be a visual surface, so that consumers may oversee the visual effect of the molded film 100G from the top surface 108*a* of the optical hardening layer 108. In the embodiment, the third decoration layer 144 may be formed of the first coating, which may be printed in a single time or multiple times to present different decorative patterns such as wood grain and geometric patterns. The fourth decoration layer 146 may be formed of the second coating, which may be formed on the first surface 102*a* of the substrate 102 by a physical vapor deposition method (e.g., an evaporation method, a sputtering method, and the like), an electroplating method, or the like. The optical hardening layer 108 may have a protective effect to prevent the third decoration layer 144 from being scratched or damaged. On the other hand, the anti-impact adhesive layer 118 may be disposed on the second surface 102*b* of the substrate 102 and in contact with the second surface 102*b* of the substrate 102. In the embodiment, the molded film 100G may be attached to the outer surface 200*a* of the workpiece 200 through the anti-impact adhesive layer 118.

Note that the decorated molding article 70 further includes a first groove 105*a* and a second groove 105*b*. The first groove 105*a* is formed in the composite layer structure 180. That is, the first groove 105*a* extends downward from the top surface 108*a* of the optical hardening layer 108 into the third decoration layer 144. The second groove 105*b* is formed in the anti-impact adhesive layer 118. That is, the decorated molding article 70 of the embodiment may have grooves formed on opposite sides (i.e., the upper side and the lower side) to increase different light transmission areas, thereby improving the visual perception of consumers.

In the embodiment, as shown in FIG. 12B and FIG. 12C, the decorated molding article 70 may emit light of various colors through the grooves 105*a* and 105*b*. For example, the light source 300 may be blue light, the third decoration layer 144 may be a wood grain layer, and the fourth decoration layer 146 may be a vapor-deposited metal layer with a transparency of 50%. When the light source 300 is off, the consumer may see the wood grain layer with metal edges from the visual surface 108*a* through the first groove 105*a* as shown in FIG. 12B. On the other hand, when the light source 300 is on, the consumer may see the wood grain layer with metal edges and blue lettering from the visual surface 108*a* through the first groove 105*a* and the second groove 105*b*.

Figure 13A:
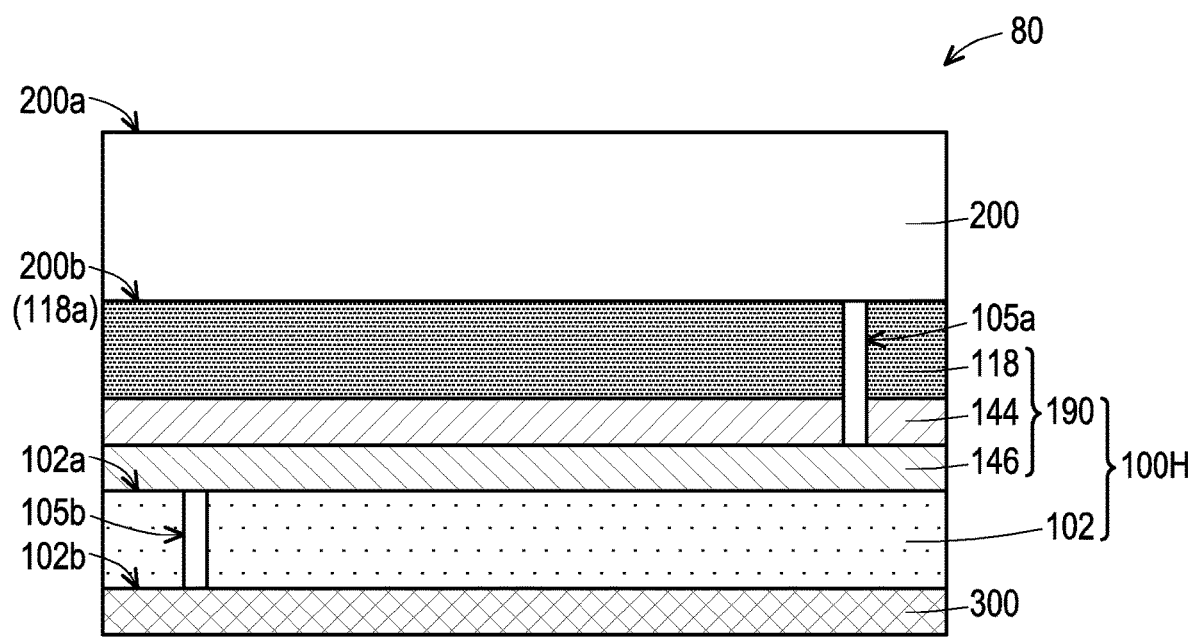
FIG. 13A is a schematic cross-sectional view of a decorated molding article according to an eighth embodiment of the disclosure.
Figure 13B:
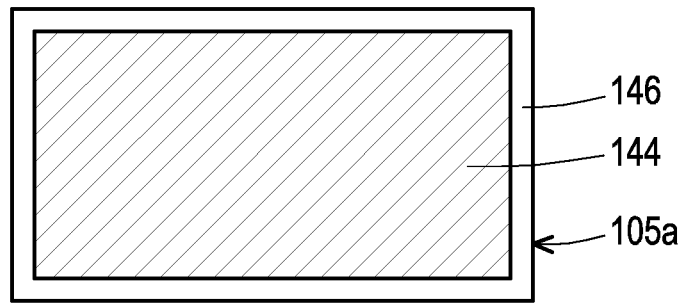
FIG. 13B and FIG. 13C are schematic top views of the structure of FIG. 13A when the light source is off and when the light source is on, respectively.
Figure 13C:
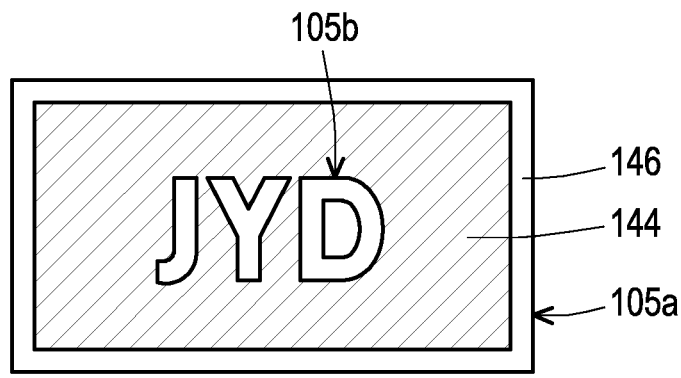

FIG. 13A is a schematic cross-sectional view of a decorated molding article according to an eighth embodiment of the disclosure. FIG. 13B and FIG. 13C are schematic top views of the structure of FIG. 13A when the light source is off and when the light source is on, respectively.

Referring to FIG. 13A, a decorated molding article 80 of the eighth embodiment may include the workpiece 200 and a molded film 100H. The molded film 100H may be disposed on the inner surface 200*b* of the workpiece 200, and the light source 300 may be disposed under the molded film 100H, so that the molded film 100H is sandwiched between the workpiece 200 and the light source 300. Specifically, the molded film 100H may include the substrate 102 and a composite layer structure 190. The substrate 102 has the first surface 102*a* and the second surface 102*b* opposite to each other. The composite layer structure 190 may be disposed on the first surface 102*a* of the substrate 102. The composite layer structure 190 may include the third decoration layer 144, the fourth decoration layer 146, and the anti-impact adhesive layer 118. The fourth decoration layer 146 may be in contact with the first surface 102*a* of the substrate 102. The anti-impact adhesive layer 118 may be disposed on the fourth decoration layer 146. The third decoration layer 144 may be disposed between the fourth decoration layer 146 and the anti-impact adhesive layer 118. In the embodiment, the outer surface 200*a* of the workpiece 200 may be a visual surface, so that consumers may oversee the visual effect of the molded film 100H from the outer surface 200*a* of the workpiece 200. In the embodiment, the third decoration layer 144 may be formed of the first coating, which may be printed in a single time or multiple times to present different decorative patterns such as wood grain and geometric patterns. The fourth decoration layer 146 may be formed of the second coating, which may be formed on the first surface 102*a* of the substrate 102 by a physical vapor deposition method (e.g., an evaporation method, a sputtering method, and the like), an electroplating method, or the like. The anti-impact adhesive layer 118 may have an adhesive function, so that the molded film 100H may be attached to the inner surface 200*b* of the workpiece 200 through the anti-impact adhesive layer 118.

Note that the decorated molding article 80 further includes the first groove 105*a* and the second groove 105*b*. The first groove 105*a* is formed in the composite layer structure 190. That is, the first groove 105*a* extends downward from the top surface 118a of the anti-impact adhesive layer 118 into the third decoration layer 144. The second groove 105b is formed in the substrate 102 to extend from the first surface 102a to the second surface 102b. That is, the decorated molding article 80 of the embodiment may be formed with grooves on opposite sides (i.e., the upper side and the lower side) to increase different light transmission areas, thereby improving the visual perception of consumers.

In the embodiment, as shown in FIG. 13B and FIG. 13C, the decorated molding article 80 may emit light of various colors through the grooves 105a and 105b. For example, the light source 300 may be blue light, the third decoration layer 144 may be a wood grain layer, and the fourth decoration layer 146 may be a vapor-deposited metal layer with a transparency of 50%. When the light source 300 is off, the consumer may see the wood grain layer with metal edges from the visual surface 200a through the first groove 105a as shown in FIG. 13B. On the other hand, when the light source 300 is on, the consumer may see the wood grain layer with metal edges and blue lettering from the visual surface 200a through the first groove 105a and the second groove 105b.

Moreover, any one of the decorated molding articles 10, 20, 30, 40, 50, 60, 70, and 80 may be applied to vehicle lights. That is, any one of the decorated molding articles 10, 20, 30, 40, 50, 60, 70, 80 may be attached to the plastic shell of the car lamp to present a variety of different color effects by a laser engraved pattern (e.g. the groove 105). For example, in the disclosure, multiple grooves 105 may correspond to lamp bodies of different colors, so that the brake light shows red light through the first groove, the left turn lamp shows yellow light through the second groove, and the headlight shows white light through the third groove.

In summary, in the disclosure, the all-in-one coating is formed on the substrate and the curing step is performed to form a composite layer structure with protective effects, color effects, and bonding effects. This composite layer structure may form a molded film with better physical properties (e.g., higher hardness, better protection effect, and the like) after the blister molding process. Therefore, the molded film of the embodiments may be applied to a laser engraving process to form a variety of light-transmitting decorated molding articles. Moreover, in the disclosure, the laser engraving process is performed after the blister molding process. Therefore, the disclosure may solve the alignment problem of the conventional technology, thereby improving the yield rate and reducing the fabricating cost.

What is claimed is:

1. A method of fabricating a decorated molding article, comprising:
providing a first coating mixture and a second coating mixture, wherein the first coating mixture and the second coating mixture respectively at least comprise a protective material, an ink material, and a bonding material uniformly mixed together;
forming the first coating mixture on a substrate by using a coating method or a printing method;
forming the second coating mixture on the first coating mixture by using the coating method or the printing method;
performing a first curing step to form a composite layer structure, wherein the composite layer structure at least comprises:
a decoration layer, formed from the first coating mixture and disposed on the substrate; and
an optical hardening layer formed from the second coating mixture and disposed on the decoration layer;
performing a blister molding process to form a molded film, wherein the blister molding process comprises:
heating the composite layer structure and the substrate to soften the composite layer structure and the substrate into a mold; and then;
pressurizing to mold into a desired shape;
performing a second curing step on the molded film to increase a hardness of the molded film; and
performing a laser engraving process on the molded film to form a groove extending downward from a top surface of the optical hardening layer into the decoration layer.

2. The method of fabricating the decorated molding article according to claim 1, wherein the protective material comprises polymethyl methacrylate (PMMA), aliphatic urethane diacrylate, epoxy acrylate (EA), polyester polyol, or a combination thereof; the ink material comprises polyurethane (PU); and the bonding material comprises thermoplastic polyurethane (TPU), aromatic urethane diacrylate, or a combination thereof.

3. The method of fabricating the decorated molding article according to claim 1, wherein the first coating mixture and the second coating mixture respectively further comprise a heat-resistant material, a solvent, and a hardener.

4. The method of fabricating the decorated molding article according to claim 1, wherein after the blister molding process is performed, the method further comprises:
performing in-mold decoration or out mold decoration technique to the molded film, so that the molded film is attached to an outer surface of a workpiece to form the decorated molding article.

5. The method of fabricating the decorated molding article according to claim 1, wherein after the laser engraving process is performed, the method further comprises:
performing in-mold decoration or out mold decoration technique to the molded film, so that the molded film is attached to an inner surface of a workpiece to form the decorated molding article.

* * * * *